United States Patent Office 3,264,254
Patented August 2, 1966

3,264,254
REACTING VULCANIZABLE ELASTOMERS WITH DINITROSOANILINES
Ching C. Tung, Nitro, W. Va., assignor to Monsanto Company, a corporation of Delaware
No Drawing. Filed June 11, 1956, Ser. No. 590,397
24 Claims. (Cl. 260—41.5)

The present application is a continuation-in-part of application Serial No. 511,422, filed May 26, 1955, now abandoned.

The present invention relates to a process of improving the properties of rubber compositions and particularly butyl rubber compositions. More particularly the invention relates to the heat processing of butyl rubber, to the vulcanizing of such treated butyl rubber and to the vulcanized butyl rubber so obtained.

Butyl rubber is the well recognized and commonly employed generic name applied to a variety of elastic copolymers of isobutylene and small quantities of diolefins. The diolefins are usually selected so to produce a final product which possesses only a small percentage of the unsaturation of natural rubber. The content of combined diolefin hydrocarbon commonly is not greater than 15%. Due to this low unsaturation, butyl rubber is very stable and for the same reason is difficult to vulcanize. The vulcanization reaction is not only sluggish but the vulcanized products fail to possess the modulus of elasticity, resilience and resistance to flow required for many uses. These characteristics in the past have limited to a considerable extent the field of usefulness of butyl rubber. It has now been found possible to supply means and methods for improving the characteristics mentioned and thereby to enlarge the area of usefulness of the vulcanized product.

An object of the present invention is to improve the properties of diene elastomers and particularly to butyl rubber vulcanizates by means of special treating agents, to provide a means to increase the modulus of elasticity and otherwise to improve the physical properties of the vulcanizate. A further object of the invention is to provide a process for simplifying and modifying the heat treatment of butyl rubber as well as lowering the torsional hysteresis of the vulcanizates. A further object is to provide a special group of chemical compounds which have been found to improve the properties of butyl rubber when heated with the rubber. A specific object is to promote the reaction between butyl rubber and carbon black or other reinforcing pigments by chemical means.

It has been found in accordance with the present invention that dinitroso mixed aromatic aliphatic amines having one nitroso group substituted on the aromatic ring and a second nitroso group on the secondary amino group, modify the properties and promote the heat treating of butyl rubber, with or without the presence of carbon black. Such nitroso amines most conveniently may be represented by means of the following general formula

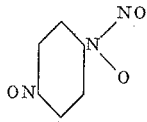

wherein X represents an alkyl, aryl, aralkyl such as benzyl, alicyclic such as cyclohexyl, or olefinic substituent or substituted derivatives thereof. Heating butyl rubber without curatives in the presence of a small amount of one of these dinitroso amines effects a reaction which not only increases the modulus of elasticity of the vulcanizates markedly but also retains reasonable elongations. For promoting reaction with carbon black, the proportion of carbon black should be at least 25 parts per hundred parts of butyl rubber and preferably within the range of 25–60 parts of carbon black. The heating should be above 121° C. (250° F.) and preferably at 149–188° C. (300-370° F.) with heating times ranging from one minute to 16 hours. The compositions are masticated either during or after the heat treatment. If desired, additional dinitrosoamine may be added with the vulcanizing ingredients to the rubber reacted with dinitrosoamine.

As one specific embodiment of the invention, butyl rubber compositions were compounded comprising:

|  | Parts by Weight | |
|---|---|---|
| Butyl rubber | 100 | 100 |
| Carbon black | 50 | 50 |
| N-Methyl-N,4-dinitrosoaniline | | 0.5 |

The butyl rubber was GR–I 17, a copolymer of 97.5% isobutylene and 2.5% isoprene (1.5–1.9 mole percent unsaturation, molecular weight about 445,000). A high abrasion furnace black (Philblack O) was used to compound one set of compositions and a channel black (Kosmobile S-66) was used to prepare another. The compositions were then divided and one-half treated for four hours in an oven at about 302° F. (150° C.). All the compositions were then masticated on a mill and vulcanizable stocks prepared by adding to the bases zinc oxide 5, tetramethyl thiuram disulfide, 1, 2,2'-dithiobis benzothiazole 1 and sulfur 2 parts by weight. The stocks were then vulcanized by heating in a press 45 minutes at 291° F. (144° C.). The physical properties before and after heat treatment are summarized in Table I.

TABLE I

Furnace Black Stocks Without Heat Treatment

| Nitrosoamine | Modulus of Elasticity in lbs./in.² at 300% Elongation | Tensile at Break in lbs./in.² | Ultimate Elongation, percent | Torsional Hysteresis |
|---|---|---|---|---|
| None | 1,620 | 2,610 | 510 | 0.404 |
| N-methyl-N,4-dinitrosoaniline | 2,040 | 2,680 | 460 | 0.292 |

Channel Black Stocks Without Heat Treatment

| | | | | |
|---|---|---|---|---|
| None | 1,100 | 3,030 | 680 | 0.405 |
| N-methyl-N,4-dinitrosoaniline | 1,570 | 3,260 | 600 | 0.262 |

Furnace Black Stocks Heat Treated

| | | | | |
|---|---|---|---|---|
| None | 1,800 | 2,660 | 480 | 0.369 |
| N-methyl-N,4-dinitrosoaniline | 2,530 | 2,920 | 380 | 0.158 |

Channel Black Stocks Heat Treated

| | | | | |
|---|---|---|---|---|
| None | 1,530 | 3,080 | 600 | 0.310 |
| N-methyl-N,4-dinitrosoaniline | 1,890 | 3,070 | 460 | 0.138 |

The torsional hysteresis was determined at room temperature with an apparatus which embodied a torsion pendulum. The sample of rubber tested supplied the force to restore the pendulum when it was deflected. The logarithmic decrement of the observed amplitude was recorded.

Another series of tests were carried out, similar in procedure to the one just described but in which a mixture of furnace and channel blacks were employed and also plurality of dinitroso compounds were tested. Master batches comprising 100 parts of butyl rubber (GR–I 17), 15 parts furnace black (Philblack O), 35 parts of channel black (Kosmobile S-66) were prepared in duplicate, one with 0.5 part of the selected dinitrosoamine and one containing no additive. The batches were mixed in a Banbury mill for 10 minutes at 300° F. (149° C.). Thereupon to each batch there were added on a mill at 122° F. (50° C.) 5 parts of zinc oxide, 2 parts of slufur, 1 part of tetramethyl thiuram disulfide and 1 part of 2,2'-dithiobis benzothiazole and vulcanization of all the respective batches completed by heating for 45 minutes in a press at 292° F. (145° C.). The results obtained are set forth in Table II.

TABLE II

| Nitrosoamine | Modulus of Elasticity in lbs./in.² at 300% Elongation | Tensile at Break in lbs./in.² | Ultimate Elongation, percent | Torsional Hysteresis |
| --- | --- | --- | --- | --- |
| None | 1,510 | 3,070 | 570 | 0.387 |
| N-methyl-N,4-dinitrosoaniline | 2,160 | 2,860 | 400 | 0.162 |
| 1-nitroso-4-(p-nitrosophenyl)piperazine | 1,860 | 3,020 | 490 | 0.281 |
| N,N'-dinitroso-N,N'-bis(p-nitrosophenyl)-ethylenediamine | 1,610 | 2,820 | 520 | 0.381 |

Further tests were carried out employing 1.0 part of the dinitrosoamine. Mixtures comprising 100 parts of butyl rubber (GR–I 17), 15 parts furnace black (Philblack 0), 35 parts of channel black (Kosmobile S–66) were prepared in duplicate on a mill at 50° C., one with the dinitrosoamine and one containing no additive. The batches were heated in a Banbury mill for 10 minutes at 302° F. (150° C.). Thereupon to each batch there was added on a mill 5 parts zinc oxide, 2 parts sulfur, 1 part tetramethyl thiuram disulfide and 1 part of 2,2'-dithiobis benzothiazole and vulcanization of all the respective batches completed by heating for 45 minutes in a press at 292° F. (145° C.). The results obtained are set forth below:

TABLE III

| Nitrosoamine | Modulus of Elasticity in lbs/in.² at 300% Elongation | Tensile at Break in lbs./in.² | Ultimate Elongation, percent |
| --- | --- | --- | --- |
| None | 1,280 | 2,740 | 560 |
| N-methyl-N,4-dinitrosoaniline | 2,240 | 2,910 | 400 |

The amount of dinitroso aromatic amine will vary depending upon the particular stock and the results desired. Amounts within the range of 0.01 to 3.0 parts per 100 parts of rubber cover the useful range for most purposes. Optimum properties have been obtained with amounts within the range of 0.1–1.0 part.

The effect of different amounts of the dinitroso aromatic amines on the physical properties of the vulcanizates and also the effect on scorch of the unvulcanized stock is illustrated in detail in Table IV. In these further specific embodiments of the invention, compositions of 100 parts by weight of butyl rubber and 50 parts by weight of carbon black were compounded and admixed with small and varying amounts of N-methyl-N,4-dinitrosoaniline. The compositions were then divided and one-half of each composition heated 4 hours in an oven at 302° F. (150° C.). All of the compositions were then masticated on a mill and vulcanizable stocks prepared as shown in Table I and vulcanized as has been there described. The modulus of elasticity at 300% elongation and the torsional hysteresis of the vulcanizates obtained before and after heat treatment are summarized in the table following. In addition, the resistance to prevulcanization or scorch of the unvulcanized but vulcanizable stocks was determined by use of a Mooney plastometer. The time required for incipient vulcanization or scorch was taken at the point on the plasticity curve at 135° C. when the plasticity began to rise continuously and reached an arbitrary value of 10 unit points above the minimum value. The resistance to scorch is an important attribute. The results follow:

TABLE IV

Without Heat Treatment

| Concentration of Activator | Modulus of Elasticity in lbs./in.² at 300% Elongation | | Torsional Hysteresis | | Scorch in Minutes | |
| --- | --- | --- | --- | --- | --- | --- |
| | Furnace | Channel | Furnace | Channel | Furnace | Channel |
| None | 1,520 | 900 | .455 | .444 | 13.7 | 13.4 |
| 0.1 | 1,910 | 1,190 | .370 | .370 | 13.5 | 13.6 |
| 0.3 | 1,780 | 1,290 | .290 | .290 | 12.7 | 13.8 |
| 0.5 | 1,720 | 1,420 | .276 | .276 | 12.7 | 12.5 |
| Heat Treatment | | | | | | |
| None | 1,680 | 1,390 | .415 | .371 | 16.6 | 17.5 |
| 0.1 | 2,000 | 1,470 | .284 | .268 | 17.3 | 17.5 |
| 0.3 | 2,350 | 1,890 | .185 | .178 | 19.8 | 17.0 |
| 0.5 | 2,440 | 1,840 | .163 | .154 | 19.0 | 18.3 |

Another series of tests were completed in which the butyl rubber and dinitroso compound were heated together as described hereinafter, following which carbon black was added to the treated rubber and thereupon the balance of the ingredients were added and the various mixes were then vulcanized. In these tests 100 parts of butyl rubber (GR–I 17) were mixed for 10 minutes at a temperature of 300° F. (149° C.) in a Banbury mill with 0.5 part of the dinitroso compound. Following this, a mixture of 15 parts furnace black (Philblack 0) and 35 parts of a channel black (Kosmobile S–66) were added in the Banbury and the whole mixed for 10 minutes at 300° F. (149° C.). The balance of the compounding ingredients comprising 5 parts of zinc oxide, 2 parts of sulfur, 1 part of tetramethyl thiuram disulfide and 1 part of 2,2'-dithiobis benzothiazole were then added to the mix on the differential rubber mill at a temperature of 50° C. Vulcanization of the various mixes was then completed in a press by heating for 45 minutes at 144° C. The results of tests on the various stocks follow:

TABLE V

| Nitrosoamine | Modulus of Elasticity in lbs./in.² at 300% Elongation | Tensile at Break in lbs./in.² | Ultimate Elongation, percent | Torsional Hysteresis |
|---|---|---|---|---|
| None | 1,550 | 2,940 | 560 | .404 |
| N-methyl-N,4-dinitrosoaniline | 2,070 | 2,680 | 410 | .159 |
| 3-(N,4-dinitroso anilino) propionamide | 1,820 | 3,010 | 480 | .271 |
| N-ethyl-N,4-dinitrosoaniline | 1,950 | 2,880 | 460 | .238 |
| N-(2-chloroallyl)-N,4-dinitrosoaniline | 1,820 | 2,750 | 470 | .206 |
| N,4-dinitroso-N-propyl aniline | 1,830 | 2,860 | 480 | .198 |
| 2-(N,4-dinitroso anilino) ethanol | 1,780 | 2,780 | 480 | .315 |

Another example of the invention is the following, of a light colored vulcanized rubber, wherein silica has been substituted for the carbon black employed in the previous examples. In this stock a master batch comprising 100 parts of butyl rubber (GR–I 17), 50 parts silica (Hi-Sil X–233), 2 parts stearic acid and 3 parts glycerol was prepared by mixing in a Banbury mill at a temperature of 170° F. (77° C.). After cooling somewhat, the master batch was transferred to a differential rubber mill and 1.0 part of N-methyl-N,4-dinitrosoaniline mixed therewith at a temperature of about 122° F. (50° C.). Heat treatment of the so mixed batch was then completed by 10 minutes milling at 300° F. (149° C.). Thereupon final compounding of the other ingredients comprising 5 parts zinc oxide, 3 parts dibutyl phthalate, 1 part 2-mercaptobenzothiazole, 1 part tellurium diethyl dithiocarbamate and 2 parts sulfur was completed on the mill at 122° F. (50° C.) and the compounds were then vulcanized by heating in a press for 60 minutes at 292° F. (145° C.). The test results obtained were as follows:

TABLE VI

| Dinitroso Compound | Modulus of Elasticity in lbs./in.² at Elongation | | Tensile Strength, lbs./in.² | Ult. Elong., Percent | Torsional Hysteresis |
|---|---|---|---|---|---|
| | 300% | 500% | | | |
| None | 430 | 930 | 2,190 | 720 | .284 |
| N-methyl-N,4-dinitrosoaniline | 840 | 1,540 | 1,950 | 620 | .280 |

Alternatively, the rubber may be modified by heating with the dinitrosoamine and the rubber so reacted admixed with silica, clay or other light colored pigment, curatives and then vulcanized to produce improved light colored vulcanizates.

Still another test was carried out to demonstrate the effectiveness of the preferred class of additives for butyl rubber. In the manner previously described, master batches were prepared of 100 parts butyl rubber (GR–I 17) with 50 parts respectively of furnace black (Philblack 0) and also of channel black (Kosmobile S–66). Portions of each of the two master batches were taken, and to parts of these portions, the various dinitroso additives as set forth in Table VII hereinafter, in ratio of 0.5 part additive to 150 parts of master batch were mixed in by mill action. One-half of each of the various stocks so obtained were then wrapped in aluminum foil and were then heat treated in an oven for four hours at 150° C. All the stocks, the heated and the unheated, were then made into completely compounded stocks, by mixing on the mill with (to each 100 parts of rubber taken) 5 parts of zinc oxide, 2 parts of sulfur, 1 part of tetramethyl thiuram disulfide and 1 part of 2,2'-dithiobis benzothiazole. Vulcanization of all the stocks so prepared was then performed by heating in a press for 45 minutes at 291° F. (144° C.). The results of the tests carried out on these various stocks are set forth in tabular form in Table VII.

TABLE VII

| Type Carbon Black | Hours in oven at 150° C. | Dinitroso Compound | Modulus of Elasticity in lbs./in.² at 300% Elongation | Tensile at Break in lbs./in.² | Elong. at Break, percent | Torsional Hysteresis |
|---|---|---|---|---|---|---|
| Furnace | 0 | None | 1,480 | 2,350 | 490 | 0.375 |
| | 4 | do | 1,570 | 2,490 | 470 | 0.338 |
| | 0 | N,4-dinitroso N-ethyl aniline | 2,090 | 2,830 | 440 | 0.265 |
| | 4 | | 2,550 | 2,730 | 340 | 0.126 |
| Channel | 0 | None | 1,000 | 3,110 | 680 | 0.357 |
| | 4 | do | 1,310 | 3,030 | 570 | 0.271 |
| | 0 | N,4-dinitroso N-ethyl aniline | 1,520 | 3,120 | 570 | 0.198 |
| | 4 | | 1,910 | 2,870 | 420 | 0.124 |
| Furnace | 0 | None | 1,620 | 2,610 | 510 | 0.404 |
| | 4 | do | 1,800 | 2,660 | 480 | 0.369 |
| | 0 | N,4-dinitroso diphenylamine | 1,560 | 2,570 | 510 | 0.386 |
| | 4 | | 1,910 | 2,710 | 460 | 0.310 |
| Channel | 0 | None | 1,100 | 3,030 | 680 | 0.405 |
| | 4 | do | 1,530 | 3,080 | 600 | 0.310 |
| | 0 | N,4-dinitroso diphenylamine | 1,090 | 3,060 | 700 | 0.354 |
| | 4 | | 1,360 | 2,950 | 590 | 0.246 |
| Furnace | 0 | None | 1,500 | 2,600 | 510 | 0.384 |
| | 4 | do | 1,600 | 2,640 | 500 | 0.380 |
| | 0 | Methyl N-nitroso-N-(p-nitrosophenyl) beta-alinate | 1,610 | 2,670 | 520 | 0.388 |
| | 4 | | 1,620 | 2,680 | 480 | 0.331 |
| Channel | 0 | None | 910 | 3,190 | 700 | 0.403 |
| | 4 | do | 1,370 | 3,110 | 580 | 0.314 |
| | 0 | Methyl N-nitroso-N-(p-nitrosophenyl) beta-alinate | 1,100 | 3,170 | 660 | 0.331 |
| | 4 | | 1,650 | 3,280 | 530 | 0.250 |
| Furnace | 0 | None | 1,480 | 2,350 | 490 | 0.375 |
| | 4 | do | 1,570 | 2,490 | 470 | 0.338 |
| | 0 | N,4-dinitroso-N-butylaniline | 1,490 | 2,440 | 500 | 0.379 |
| | 4 | | 1,780 | 2,480 | 440 | 0.290 |
| Channel | 0 | None | 1,000 | 3,110 | 680 | 0.357 |
| | 4 | do | 1,310 | 3,030 | 570 | 0.271 |
| | 0 | N,4-dinitroso-N-butylaniline | 1,190 | 3,240 | 660 | 0.317 |
| | 4 | | 1,490 | 3,060 | 530 | 0.225 |

Compared to less saturated rubber, butyl rubber requires higher accelerator levels to develop maximum properties in the vulcanized stocks. Although only one accelerator combination is set forth in the various examples, it is to be understood that other dithiocarbamates, thiuram sulfides and thiazole accelerators active with butyl rubber may be employed. In a like manner, the heating range for treatment of the butyl rubber, both in a black master batch and by itself, may be varied between rather wide limits, for example from about 50° C. up to about 175° C. Furthermore, the period of heat treatment is not limited to the actual times shown in the examples, as such periods may extend from 2 to 16 hours in the static treatments or from 1 to 30 minutes in the dynamic treatments. Under dynamic conditions the time of heat treatment may be very short. For example, a series of tests was carried out employing master batches comprising 100 parts of butyl rubber (GR–I 17), 15 parts furnace black (Philblack 0), 35 parts of channel black (Kosmobile S–66). One portion of the master batch was heated for a short time without additive as a control and others were heated with 0.5 part of N-methyl-N,4-dinitrosoaniline for varying lengths of time. All the batches were heated in a Banbury mill at about 302° F. (150° C.). Thereupon to each batch there was added on a mill at 122° F. (50° C.) 5 parts of zinc oxide, 2 parts of sulfur, 1 part of tetramethyl thiuram disulfide and 1 part of 2,2'-dithiobis benzothiazole and vulcanization of all the respective batches completed by heating for 45 minutes in a press at about 292° F. (144° C). The results are set forth in the table below compared to the control stock containing no dinitrosoamine.

TABLE VIII

| Time of Heating Minutes | Modulus of Elasticity in lbs./in.$^2$ at 300% Elongation | Tensile at Break in lbs./in.$^2$ | Ultimate Elongation, Percent | Torsional Hysteresis |
|---|---|---|---|---|
| 4 (control) | 1,180 | 2,930 | 610 | 0.373 |
| 1 | 1,940 | 3,010 | 450 | 0.150 |
| 3 | 2,210 | 2,970 | 400 | 0.142 |
| 5 | 2,150 | 2,990 | 410 | 0.137 |
| 7 | 2,190 | 3,030 | 400 | 0.147 |
| 10 | 2,200 | 2,990 | 400 | 0.139 |

Other dinitrosoamines than those particularly mentioned above are effective, as for example N,p-dinitroso-N-heptylaniline, N,p-dinitroso-N-amylaniline N,p-dinitroso-N-octylaniline. Likewise the treatment described is effective for other diene hydrocarbon rubbers including natural rubber, butadiene-styrene copolymer rubber and synthetic polyisoprene rubber. Master batches were prepared comprising

| | Parts by weight | |
|---|---|---|
| | A | B |
| Smoked sheets | 100 | |
| Butadiene-styrene copolymer rubber (GR-S 1500) | | 100 |
| Furnace black (Philblack 0) | 15 | 15 |
| Channel black (Kosmobile S-66) | 35 | 35 |

The raw rubber was added to a Banbury mill at 302° F. (150° C.), mixed one minute, then the black added, mixing continued 5 minutes at the same temperature and removed from the mill. In identical manner the batches were duplicated, adding to each along with the carbon black, 0.5 part of N-methyl-N,4-dinitrosoaniline. The batches were then returned to the Banbury and vulcanizing ingredients added at 150° F. (70° C.) as follows:

| | Parts by weight | |
|---|---|---|
| | A | B |
| Zinc oxide | 5.0 | 4.0 |
| Stearic acid | 3.0 | 2.0 |
| Hydrocarbon softener | 3.0 | 10.0 |
| N-cyclohexyl-2-benzothiazole-sulfenamide | 0.5 | 1.2 |
| Sulfur | 2.5 | 1.75 |

Vulcanization of the various mixes was then completed in a press by heating the natural rubber stock 45 minutes and the GR–S stock 60 minutes at 291° F. (144° C.). The physical properties of the stocks derived from rubber treated with the dinitrosoamine compared to the untreated controls were as follows:

TABLE IX

| Rubber | Modulus of Elasticity in lbs./in.$^2$ at 300% Elongation | Tensile at Break in lbs./in.$^2$ | Ultimate Elongation, percent | Torsional Hysteresis |
|---|---|---|---|---|
| Smoked sheets control | 1,790 | 3,530 | 490 | 0.149 |
| Smoked sheets treated | 2,410 | 2,970 | 360 | 0.130 |
| GR-S control | 2,180 | 3,630 | 450 | 0.256 |
| GR-S treated | 2,320 | 3,270 | 390 | 0.268 |

The dinitroso compounds used in the practice of this invention may be made in conventional manner by Fischer-Hepp arrangement of the nitroso secondary aniline followed by a second nitrosation. A method of preparation is illustrated below:

To a stirred solution comprising 534 parts by weight (6.0 moles) of 41% hydrogen chloride in methanol was added dropwise at 0–10° C. 167.6 parts by weight (1.0 mole) of N-2-chloroallyl aniline over a period of 30 minutes. To this amine hydrochloride-methanol solution was added in one portion 82 parts by weight (1.125 moles) of 95% sodium nitrite, the stirred reaction mixture held at 5–15° C. for 24 hours and 500 ml. of ether added. After cooling to 0° C. the precipitate was filtered and air dried at room temperature.

A solution was prepared by dissolving 135 parts by weight (0.58 mole) of the p-nitroso-N-2-chloroallyl aniline hydrochloride so prepared in 29 parts by weight of hydrochloric acid and 1500 parts by weight of water. To this solution at 0.5° C. was gradually added over a period of an hour a solution of 63 parts by by weight (0.87 mole) of 95% sodium nitrite dissolved in 250 parts by weight of water. The temperature within this range was maintained for an additional 1.5 hours and the reaction mixture preferably neutralized to a pH of 7 with 25% aqueous sodium hydroxide. The resulting precipitate was removed by filtration, washed with 500 ml. of water and air dried at room temperature. The N(2-chloroallyl)-N,4-dinitrosoaniline so obtained was a brown solid melting at 89–90° C. Analysis gave 15.31% chlorine as compared to 15.71% calculated for $C_9H_8ClN_3O_2$.

The dinitroso compound may either be added to the massed rubber, to rubber in the form of latex or to a cement. In the case of isobutylene rubber the dinitroso compound may be reacted with the rubber at the place of manufacture during the processing after polymerization. Where the reaction is carried out during formulation, at least one ingredient essential for vulcanization must be absent to obtain the advantages described. Preferably the reaction is carried out in the absence of both vulcanizing agent, usually sulfur, and accelerator although either but not both may be present. Comparing, under carefully controlled conditions, the effect of heating and masticating raw butyl rubber with N-methyl-N,4-dinitrosoaniline and then admixing with carbon black and vulcanizing ingredients to that obtained by carrying out the reaction under identical conditions in the presence of carbon black indicated somewhat better properties from reacting the raw polymer.

It is intended to cover all changes and modifications of the examples of the invention herein chosen for purposes of disclosure which do not constitute departures from the spirit and scope of the invention.

What is claimed is:
1. The process which comprises heating within the range of 122° F.–370° F. for a time within the range of about one minutes to sixteen hours vulcanizable elastomer selected from the class consisting of natural rubber, butadiene-styrene, copolymer rubber, synthetic polyisoprene rubber and butyl rubber which is a copolymer of at least 85% isobutylene and a small amount, not mot more than 15% of diolefin, said elastomer having incorporated therein 0.01–3.0 parts per 100 parts by weight of elastomer hydrocarbon of nitroso aromatic amine having a nitroso group attached to the amine group and another to an aryl radical of the benzene series, any vulcanizing agents, if present, being present in amounts insufficient to cause vulcanization whereby the resilience of the subsequently cured product is improved.

2. The process which comprises heating within the range of 122° F.–370° F. for a time within the range of about one minute to sixteen hours butyl rubber which is a copolymer of at least 85% isobutylene and a small amount, not more than 15% of diolefin, said copolymer having incorporated therein 0.01–3.0 parts per 100 parts by weight of copolymer hydrocarbon of dinitroso aromatic amine having one nitroso group attached to the amine group and the other to an aryl radical of the benzene series, any vulcanizing agents, if present, being present in amounts insufficient to cause vulcanization whereby the resilience of the subsequently cured product is improved.

3. The process which comprises heating within the range of 122° F.–370° F. for a time within the range of about one minutes to sixteen hours butyl rubber which is a copolymer of at least 85% isobutylene and a small amount, not more than 15% of diolefin, said copolymer having incorporated therein 0.01–3.0 parts per 100 parts by weight of copolymer hydrocarbon of an N,4-dinitrosoaniline, any vulcanizing agents, if present, being present in amounts insufficient to cause vulcanization whereby the resilience of the subsequently cured product is improved.

4. The process which comprises heating within the range of 122° F.–370° F. for a time within the range of about one minute to sixteen hours a mixture consisting of butyl rubber which is a copolymer of at least 85% isobutylene and a small amount, not more than 15% of diolefin and 0.01–3.0 parts per 100 parts by weight of copolymer hydrocarbon of N,4 - dinitroso - N - alkylaniline whereby the resilience of the subsequently cured product is improved.

5. The process which comprises heating within the range of 122° F.–370° F. for a time within the range of about one minute to sixteen hours butyl rubber which is a copolymer of at least 85% isobutylene and a small amount, not more than 15% of diolefin, said copolymer having incorporated therein 0.01–3.0 parts per 100 parts by weight of copolymer hydrocarbon of N,4-dinitroso-N-alkylaniline, any vulcanizing agents, if present, being present in amounts insufficient to cause vulcanization whereby the resilience of the subsequently cured product is improved.

6. The process which comprises heating within the range of 122° F.–370° F. for a time within the range of about one minute to sixteen hours butyl rubber which is a copolymer of at least 85% isobutylene and a small amount, not more than 15% of diolefin, said copolymer having incorporated therein 0.1–1.0 parts per 100 parts by weight of copolymer hydrocarbon of N,4-dinitroso-N-alkylaniline in which the alkyl group contains from 1 to 5 carbon atoms inclusive, any vulcanizing agents, if present, being present in amounts insufficient to cause vulcanization whereby the resilience of the subsequently cured product is improved.

7. The process which comprises reacting within the range of 122° F.–370° F. for a time within the range of about one minute to sixteen hours butyl rubber which is a copolymer of at least 85% isobutylene and a small amount, not more than 15% of diolefin, with 0.01–3.0 parts per 100 parts by weight of copolymer hydrocarbon of a compound represented by the formula

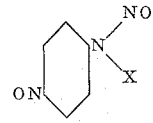

wherein X is a member of a family consisting of alkyl, aryl, aralkyl, alicyclic, olefinic and halogen substituted olefinic groups whereby the resilience of the subsequently cured product is improved.

8. The process which comprises heating within the range of 122° F.–370° F. for a time within the range of about one minute to sixteen hours butyl rubber which is a copolymer of at least 85% isobutylene and a small amount, not more than 15% of diolefin, said copolymer having incorporated therein 0.01–3.0 parts per 100 parts by weight of copolymer hydrocarbon of N,4-dinitroso-N-methylaniline, any vulcanizing agents, if present, being present in amounts insufficient to cause vulcanization whereby the resilience of the subsequently cured product is improved.

9. The process which comprises mixing within the range of 250° F.–370° F. butyl rubber which is a copolymer of at least 85% isobutylene and a small amount, not more than 15% of diolefin and 0.01–3.0 parts per 100 parts by weight of copolymer hydrocarbon of dinitroso mixed aromatic aliphatic amine having one nitroso group attached to amine nitrogen and another attached to carbon of a benzene ring, mixing and heating at the aforesaid temperature for a time within the range of about one minute to sixteen hours, any vulcanizing agents, if present, being present in amounts insufficient to cause vulcanization whereby the resilience of the subsequently cured product is improved.

10. The process which comprises mixing within the range of 250° F.–370° F. butyl rubber which is a copolymer of at least 85% isobutylene and a small amount, not more than 15% of diolefin and 0.01–3.0 parts per 100 parts by weight of copolymer hydrocarbon of N,4-dinitroso N-methylaniline, mixing and heating at the aforesaid temperature for a time within the range of about one minute to sixteen hours, any vulcanizing agents, if present, being present in amounts insufficient to cause vulcanization whereby the resilience of the subsequently cured product is improved.

11. A composition comprising unvulcanized butyl rubber which is a copolymer of at least 85% isobutylene and a small amount, not more than 15% of diolefin, reacted at a temperature within the range of 122° F.–370° F. for a time within the range of about one minute to sixteen hours, with 0.01–3.0 parts per 100 parts by weight of copolymer hydrocarbon of a dinitroso compound represented by the formula

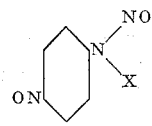

wherein X is a member of a family consisting of alkyl, aryl, aralkyl, alicyclic, olefinic and halogen substituted olefinic groups.

12. A composition comprising unvulcanized butyl rubber which is a copolymer of at least 85% isobutylene and a small amount, not more than 15% of diolefin, reacted at a temperature within the range of 122° F.–370°

F. for a time within the range of about one minute to sixteen hours, with 0.01–3.0 parts per 100 parts by weight of copolymer hydrocarbon of a dinitroso compound represented by the formula

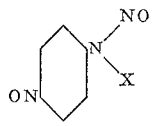

wherein X is an alkyl group containing from one to five carbon atoms.

13. A composition comprising unvulcanized natural rubber reacted at a temperature within the range of 122° F.–370° F. for a time within the range of about one minute to sixteen hours, with 0.01–3.0 parts per 100 parts by weight of rubber hydrocarbon of N,4-dinitroso N-methylaniline.

14. Vulcanized elastomer obtained by vulcanizing the product from the process of claim 1.

15. Vulcanized butyl rubber obtained by vulcanizing the product from the process of claim 5.

16. Vulcanized butyl rubber obtained by vulcanizing the product from the process of claim 10.

17. The process which comprises heating within the range of 250° F.–370° F. for a time within the range of about one minute to sixteen hours butyl rubber which is a copolymer of at least 85% isobutylene and a small amount, not more than 15%, of diolefin, said copolymer having incorporated therein carbon black within the range of 25–60 parts per 100 parts by weight of copolymer and a compound within the range of 0.01–3.0 parts per 100 parts by weight of copolymer which increases the resilience of the vulcanizate prepared from the copolymer treated as aforesaid, represented by the general formula

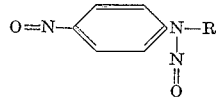

where R represents an aliphatic radical, any vulcanizing ingredients, if present, being present in amounts insufficient to cause vulcanization whereby the resilience of the subsequently cured product is improved.

18. The process which comprises heating within the range of 250° F.–370° F. for a time within the range of about one minute to sixteen hours butyl rubber which is a copolymer of at least 85% isobutylene and a small amount, not more than 15%, of diolefin, said copolymer having incorporated therein carbon black within the range of 25–60 parts per 100 parts by weight of copolymer and a compound within the range of 0.1–3.0 parts per 100 parts by weight of copolymer which increases the resilience of the vulcanizate prepared from the copolymer treated as aforesaid, represented by the general formula

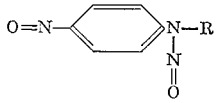

where R represents an alkyl radical, any vulcanizing ingredients, if present, being present in amounts insufficient to cause vulcanization whereby the resilience of the subsequently cured product is improved.

19. The process which comprises heating within the range of 250° F.–370° F. for a time within the range of about one minute to sixteen hours butyl rubber which is a copolymer of at least 85% isobutylene and a small amount, not more than 15%, of diolefin, said copolymer having incorporated therein carbon black within the range of 25–60 parts per 100 parts by weight of copolymer and 0.01–3.0 parts per 100 parts by weight of copolymer of N-methyl N,4-dinitrosoaniline, any vulcanizing ingredients, if present, being present in amounts insufficient to cause vulcanization whereby the resilience of the subsequently cured product is improved.

20. The process which comprises heating within the range of 300° F.–370° F. for a time within the range of about one minute to sixteen hours butyl rubber which is a copolymer of at least 85% isobutylene and a small amount, not more than 15%, of diolefin, said copolymer having incorporated therein carbon black within the range of 25–60 parts per 100 parts by weight of copolymer and 0.01–1.0 parts per 100 parts by weight of copolymer of N-methyl-N,4-dinitrosoaniline, any vulcanizing ingredients, if present, being present in amounts insufficient to cause vulcanization whereby the resilience of the subsequently cured product is improved.

21. A butyl rubber composition obtained by the process of claim 17 susceptible to vulcanization.

22. The process which comprises heating within the range of 250° F.–370° F. for a time within the range of about one minute to sixteen hours vulcanizable butadiene-styrene copolymer rubber having incorporated therein carbon black within the range of 25–60 parts per 100 parts by weight of copolymer and 0.01–3.0 parts per 100 parts by weight of copolymer of N-methyl N,4-dinitrosoaniline, any vulcanizing ingredients, if present, being present in amounts insufficient to cause vulcanization whereby the resilience of the subsequently cured product is improved.

23. The process which comprises heating within the range of 250° F.–370° F. for a time within the range of about one minute to sixteen hours natural rubber having incorporated therein carbon black within the range of 25–60 parts per 100 parts by weight of rubber and 0.01–3.0 parts per 100 parts by weight of rubber of N-methyl N,4-dinitrosoaniline, any vulcanizing ingredients, if present, being present in amounts insufficient to cause vulcanization whereby the resilience of the subsequently cured product is improved.

24. The process which comprises heating within the range of 250° F.–370° F. for a time within the range of about one minute to sixteen hours, a conjugated diene rubbery polymer having incorporated therein carbon black and from 0.01 to 3.0 parts, per 100 parts by weight of rubber, of a compound having the formula

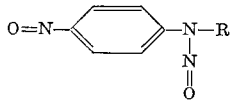

in which R is selected from the group consisting of methyl and ethyl, any vulcanizing ingredients, if present, being present in amounts insufficient to cause vulcanization whereby the resilience of the subsequently cured product is improved.

References Cited by the Examiner
UNITED STATES PATENTS

| | | | |
|---|---|---|---|
| 2,305,573 | 12/1942 | Klipstein et al. | 260—577 |
| 2,315,855 | 4/1943 | Howland | 260—763 |
| 2,315,856 | 4/1943 | Howland | 260—763 |
| 2,495,744 | 1/1950 | Roberts | 260—577 |
| 2,525,061 | 10/1950 | Baldwin | 260—79.5 |
| 2,616,876 | 11/1952 | Rehner | 260—85.3 |
| 2,811,502 | 10/1957 | Gessler et al. | 260—41.5 |
| 2,822,342 | 2/1958 | Ford et al. | 260—41.5 |
| 2,852,486 | 9/1958 | Gessler | 260—41.5 |

OTHER REFERENCES

Beilstein's Handbuch der organischen Chemie, 4th Edition, volume 12, page 366 (Beilstein System 1671).

Doak et al., Canadian Journal of Technology, vol. 33, pages 98–109, 1955.

JOSEPH L. SCHOFER, *Primary Examiner.*

DAN ARNOLD, LESLIE H. GASTON, LEON J. BERCOVITZ, *Examiners.*

J. M. TEPLITZ, J. A. SEIDLECK, *Assistant Examiners.*